No. 664,483. Patented Dec. 25, 1900.
J. KLOVSTAD & G. W. JONSEN.
VEHICLE.
(Application filed Aug. 22, 1900.)
(No Model.)
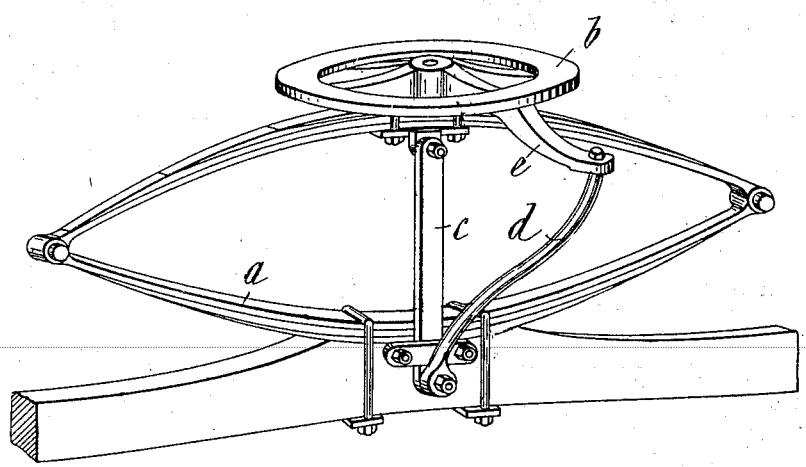
WITNESSES:
INVENTORS.
Jorgen Klovstad
Gustav Wilhelm Jonsen

UNITED STATES PATENT OFFICE.

JÖRGEN KLÓVSTAD AND GUSTAV WILHELM JONSEN, OF CHRISTIANIA, NORWAY.

VEHICLE.

SPECIFICATION forming part of Letters Patent No. 664,483, dated December 25, 1900.

Application filed August 22, 1900. Serial No. 27,669. (No model.)

*To all whom it may concern:*

Be it known that we, JÖRGEN KLÓVSTAD, carriage manufacturer, and GUSTAV WILHELM JONSEN, carriage-smith, citizens of the Kingdom of Norway, residing at 39 Hoellergaden, Christiania, Norway, have invented certain new and useful Improvements in Carriages or Vehicles; and we do hereby declare the following to be a full, clear, and exact description of the invention, such as will enable others skilled in the art to which it appertains to make and use the same.

This invention has for its object a front spring-gear for carriages or vehicles, capable of allowing of a full turn in spite of the employment of one single supporting-spring placed transversely of the vehicle. This end is attained by means of a staying device which is connected with the fifth-wheel and guided in a slot provided on the axle. This arrangement has the principal advantage of simplifying the construction, so as to allow of a considerable reduction of the weight in comparison with carriages provided with two supporting-springs. The arrangement, besides, requires very little repairs, only few parts being exposed to wear and the same being easily exchangeable.

The accompanying drawing is a perspective view showing a spring-gear construction embodying our invention.

The spring $a$ is rigidly attached to the axle, and the lower fifth-wheel $b$ is mounted upon the top of the spring. Secured to the fifth-wheel and to the upper member of the spring is a vertical bar $c$, being bolted to a plate clasping the spring from beneath and secured by screws to the cross-piece of the fifth-wheel. Said bar $c$ enters a slot or guide situated in rear of the spring and provided by securing a plate or bar to the axle by means of two bolts placed at a sufficient distance apart to provide for the vertical bar $c$ a narrow play on either side in case that the carriage, and consequently the spring, should be overloaded on one side. The vertical bar corresponds in length to the greatest expansion of the spring and is adapted to slide in the guide as far as allowed by the compression of the spring.

The necessary staying of the bar $c$ is secured by means of a rigid stay $d$, bolted to the lower end of the bar and secured with its upper end to an extension $e$ of one of the arms of the cross-piece of the fifth-wheel. The triangle thus formed is perfectly rigid, so that any concussion upon the axle will be transferred to the fifth-wheel without exposing the spring $a$ to any other strain than the vertical one. The bar $c$ may also be extended downward and connected with a similar stay $d$ in front of the axle.

The advantages of this arrangement consist in the considerable reduction of the weight obtained by the employment of one single supporting-spring, as well as by the simplicity of the construction, designed to prevent the spring-gear from yielding longitudinally, and of the insignificant repairs, the only part practically exposed to wear being the bar $c$, which, as seen, is very easily exchangeable.

We claim—

1. In combination, the axle, the spring, the fifth-wheel, a stay-bar $c$ extending down from the fifth-wheel centrally thereof and of the spring and a guide at the axle to permit vertical movement of the stay-bar and also lateral play thereof, said stay-bar resisting movement of the spring longitudinally of the vehicle, substantially as described.

2. In combination, the axle, the spring and fifth-wheel supported thereby, the stay-bar extending down from the fifth-wheel, the guide at the lower end of said bar for permitting vertical movement and lateral play of said bar, an arm $e$ extending from the fifth-wheel and a rod $d$ extending from said arm to the lower end of the stay-bar, said arm rod and bar forming a triangular structure to resist movement of the spring longitudinally of the vehicle, substantially as described.

In witness whereof we have hereunto set our hands in presence of two witnesses.

JÖRGEN KLÓVSTAD.
GUSTAV WILHELM JONSEN.

Witnesses:
THOS. KERZ,
JOH. HAALER.